Nov. 1, 1932.                A. H. ZELEDON                1,886,144
                              DISPLAY DEVICE
                    Filed April 20, 1932    3 Sheets-Sheet 1

Inventor
ALFRED H. ZELEDON
By Thomas R. Harner
                                                Attorney

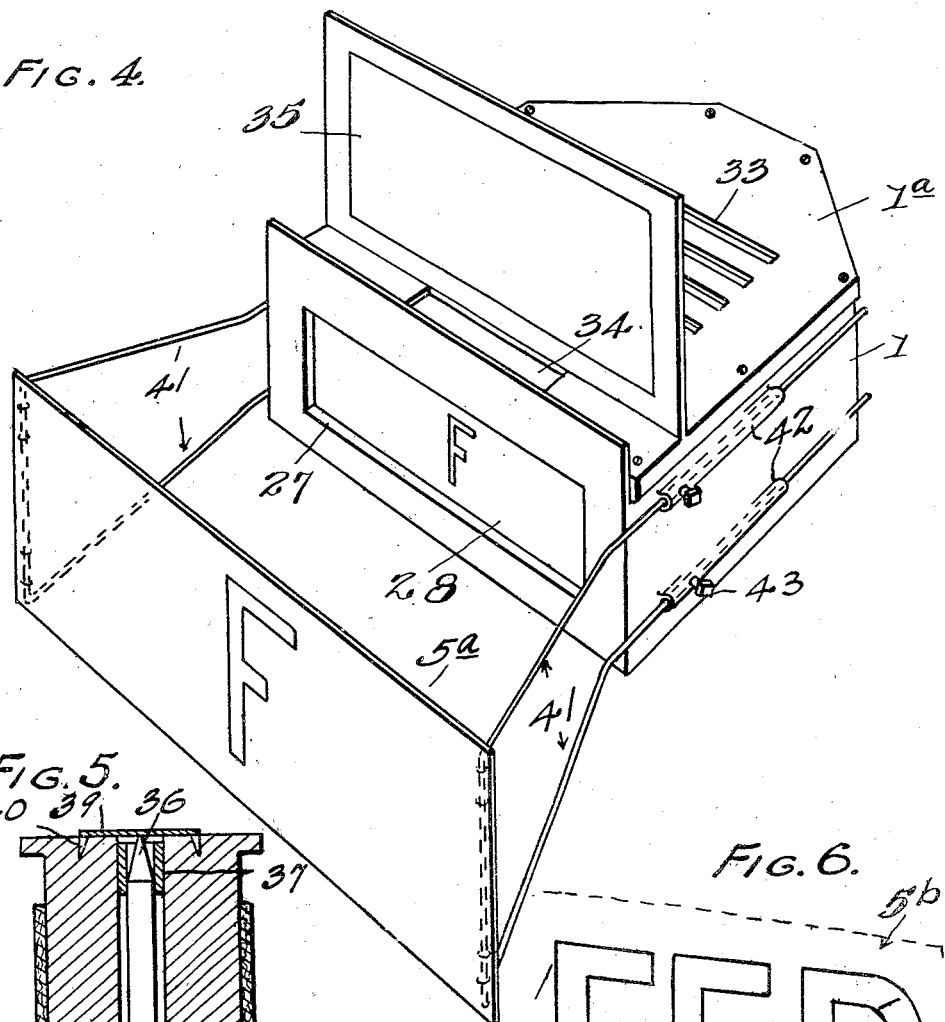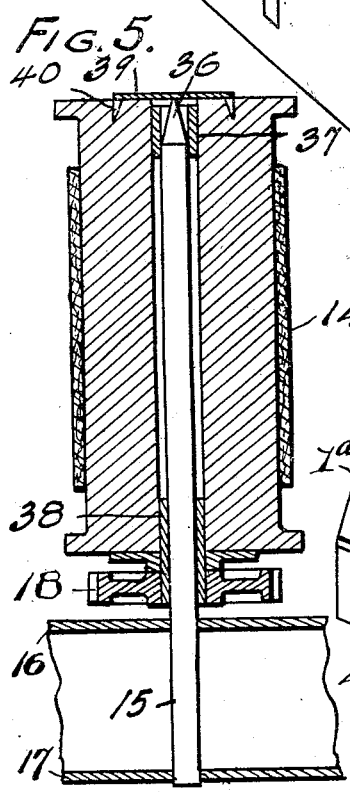

Nov. 1, 1932.  A. H. ZELEDON  1,886,144
DISPLAY DEVICE
Filed April 20, 1932   3 Sheets-Sheet 3
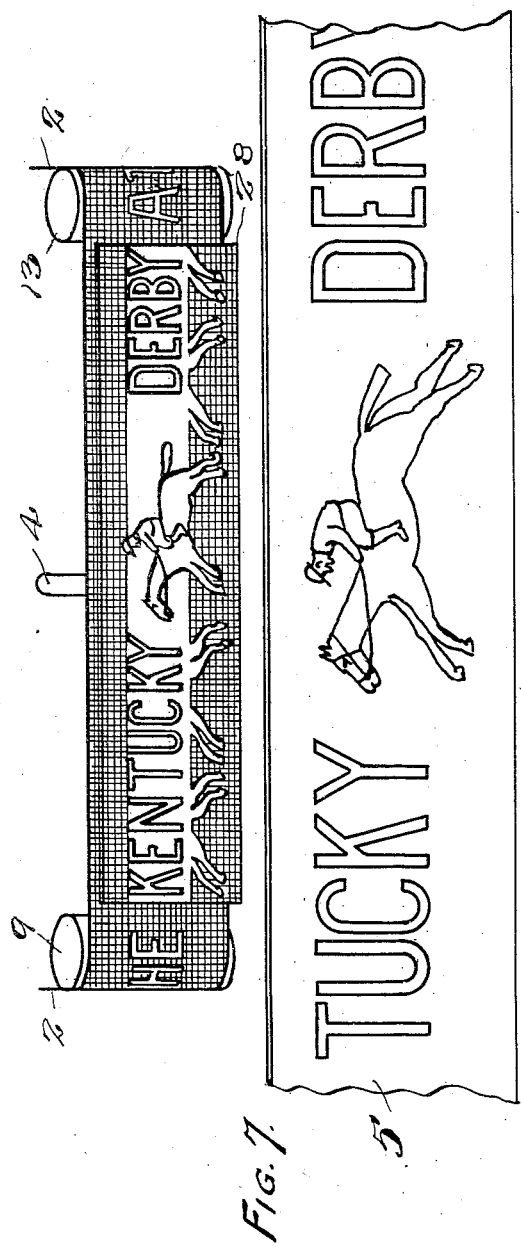
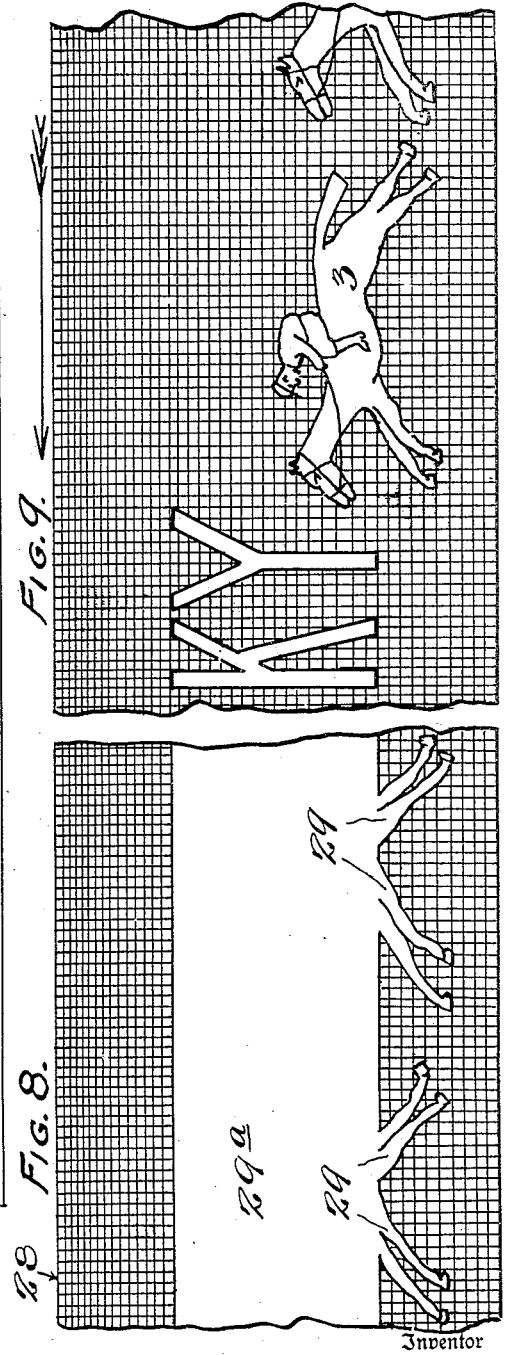
Inventor
ALFRED H. ZELEDON
By Thomas R. Harney
Attorney Patented Nov. 1, 1932

1,836,144

UNITED STATES PATENT OFFICE

ALFRED H. ZELEDON, OF CHICAGO, ILLINOIS, ASSIGNOR TO SCENE-IN-ACTION CORPORATION, OF CHICAGO, ILLINOIS, A CORPORATION OF ILLINOIS

DISPLAY DEVICE

Application filed April 29, 1932. Serial No. 608,446.

My present invention relates to an improved display device of the illuminated, endless traveling belt type, motor operated, and adapted to project an image or images upon a display screen or panel. While the device is adapted for various uses, it is particularly designed for advertising purposes, and the primary object of the invention is the provision of a device of this character that is comparatively simple in construction and operation. The device comprises a minimum number of parts that are compactly arranged, and which may be manufactured in quantities and assembled at comparatively inexpensive cost of production; and the device involves means by which the endless traveling belt or band is protected against wear, and its durability thereby enhanced.

In carrying out my invention, I employ an endless flexible band in the form of a photographic film, preferably of celluloid acetate, or other suitable material, properly sensitized, and printed with words, letters, legends, pictures, symbols, and other data. The portions of the film bearing the data are rendered transparent to permit the transmission of light rays from a lamp, and some of the transparent portions may be colored, as by staining, in order that contrasting appearances may be presented to the observer of the advertising display, or sign.

In combination with the illuminated display-flight of the flat photographic film, I utilize an outer or front translucent display panel, upon which the data of the film is projected; and in addition, I employ an intermediate screen which cooperates with the traveling film for the purpose of projecting motion effects upon the display panel, as for instance the simulation of a horse race, the reciprocating movements of the pistons of an internal combustion engine, and other animated movements, as will hereinafter be more fully pointed out.

In the accompanying drawings, I have illustrated one complete example and two modified forms of the physical embodiment of my invention wherein the parts are combined and arranged in accord with modes I have devised for the practical application of the principles of my invention, but it will be understood that various changes and alterations may be made in the exemplified structure, within the scope of my appended claims, without departing from the principles of my invention.

Fig. 4 is a perspective view showing the use of an adjustable display panel;

Fig. 5 is a detail sectional view showing the bearings for one of the drive rollers;

Fig. 6 is a perspective view illustrating a show-window-pane employed as the display-panel;

Fig. 7 is a diagrammatic view showing the enlargement of the animate and inanimate images on the display panel;

Fig. 8 shows an enlarged portion of the intermediate screen; and

Fig. 9 shows a portion of the display panel.

Figure 1:
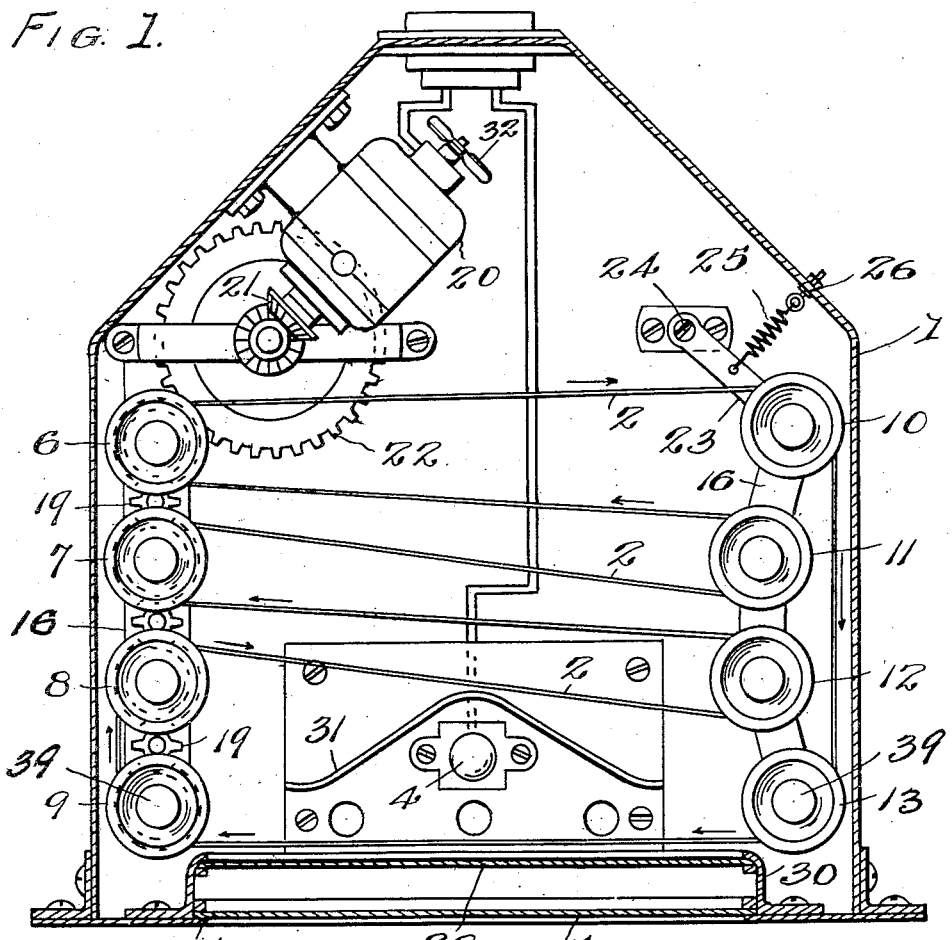
Figure 1 is a plan view of the operating parts of the display device, showing the housing intermediate screen, and display panel in section.

The operating parts of the display device are enclosed within a housing 1 which is provided with a removable lid or top-closure 1a, and the housing is shaped to accommodate the compactly arranged parts within its interior. The traveling band or endless belt, although not necessarily, is preferably a photographic film 2, and forms a screen upon which the inscriptions, data, pictures, letters, words, etc., are produced, and as shown in Figs. 7 and 9, the portion of the film bearing this subject matter is transparent. Thus the words "Kentucky derby", and the outline 3 of the jockey riding the race horse, are transparent. Because of the limiting restrictions of the sheet of drawing, I have shown only two words, and one horse, but it will of course be understood that the entire endless belt bears suitable inscriptions or advertising subject matter, and that a larger number of horses, in actual practice, are displayed on the belt.

The display-flight of the belt passes in a straight line across the field and in front of an illuminating lamp 4, which is provided with a highly concentrated filament from which the light rays are radiated and transmitted through the transparent portions of the otherwise opaque or translucent belt. The display of images of course takes place throughout the length of the illuminated display-flight of the belt, and this flight is of suitable length for the display of the desired subject matter.

The subject matter of the display is enlarged, and projected upon a front display panel 5 in Figure 1, on the panel 5a in Figure 4, or upon the panel 5b in Figure 6 which, in this instance, represents the pane of glass in a show-window.

The endless belt is conveyed in the directions as indicated by the arrows in Figure 1, and the illuminated display-flight of the belt moves from right to left in Figures 1, 4, 7 and 9, in order that the inscription, as it appears on the display panel, may be read by the observer from left to right in usual manner.

If desired, the letters or other display portions of the belt may be colored, by staining in suitable colors, so that the projected images when displayed on the display panels 5, 5a, and 5b, will be reproduced and enlarged, in attractive color or colors.

The endless band is compactly arranged on tortuous lines within the housing in order that a considerable length of band may be accommodated, without winding or reeling, or folding of the band. As thus shown, the band is maintained at all times in extended position to eliminate danger of breaking, buckling, or cracking, and to prevent marring that would occur due to frictional contact of different parts of the band.

In Figure 1, the band travels around a number, as four operating rollers 6, 7, 8 and 9, and four idle rollers 10, 11, 12 and 13, the operating roller 6 being a drive roller, and the idle roller 10 being a tension roller, while the rollers 9 and 13 are the guide rollers that form the display-flight of the traveling band.

Figure 2:
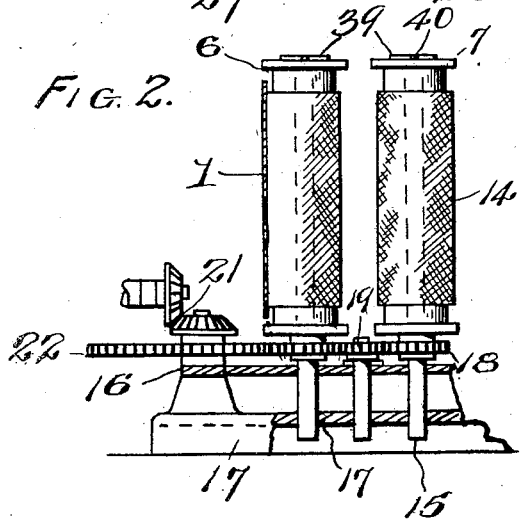
Fig. 2 is a vertical detail view, partly in section, showing two of the driving rollers for the traveling band, and the driving gears for these rollers.
Figure 3:
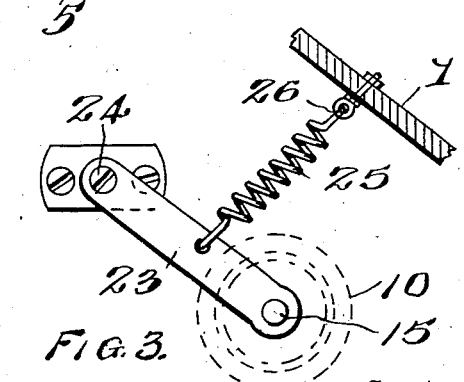
Fig. 3 is a detail plan view of the tension roller, and its connections.

As best seen in Figures 2 and 5, all of the rollers are provided with annular pads or cushions 14, which may be fashioned of velvet, or other suitable material, that will protect the film or band against wear and marring, and at the same time provide the required frictional engagement with the traveling band necessary for the operation of the device.

As shown, the upper and lower ends of the pads or cushions 14 terminate short of the upper and lower edges of the traveling band, and I find by actual practice that this freedom from frictional contact of the edges of the band with the roller, reduces wear on the edges of the band, prevents buckling, and thereby prolongs the usefulness of the band.

As best shown in Figures 2 and 5, the rotatable rollers are journaled on bearing pins 15 that have a rigid, driven fit in the two walls 16 and 17 of a base plate that is secured to the bottom of the housing for the support of the rollers.

Each roller is provided with a gear wheel 18 (preferably of fiber) at its lower end, and between these gear wheels are interposed idle pinions 19, thus forming a train of gearing for actuating the set of four operating rollers in synchronism at the left side of Figure 1, and of course the set of idle rollers at the right side of the housing in Figure 1 revolves with the movement imparted to the belt.

Any suitable motor, as an electric motor 20, may be employed for supplying the power to operate the rollers 6, 7, 8 and 9, and the bevel gear-couple 21 transmits power from the motor to the large driving gear 22, which meshes with the gear 18 of the driving roller 6, for imparting movement to the rollers and to the endless band 1.

The endless traveling band is held taut throughout its length, and maintained under the proper tension, by means of the tension roller 10 that is journaled on a pin 15 which is supported at the free end of a tension arm 23. At its other end the arm 23 is pivoted at 24 to a suitable support on the bottom of the housing, and a spring 25 has one end secured to the arm and its other end to an eye-bolt 26 in the side wall of the housing. As thus arranged, the spring tends to pull on the pivoted arm, which carries the roller 10, and in this manner the slack is taken out of the band to insure a uniform traveling motion for all parts of the traveling band.

In Figure 2, the front display-panel 5, located in a cut-out or window 27 in the front wall of the housing, is fashioned of suitable material, as white paper, which may be wholly translucent, or partially translucent, or semi-transparent, and adapted to receive the light rays emanating at the lamp 4, which rays pass through the transparencies of the traveling band, and the projected image is displayed on the panel 5.

For the simulation of animated movement on the display-panel, and in cooperation with the transparency 3 on the traveling band, I utilize an intermediate screen 28 having portions subject to different degrees of permeability of light rays emanating from the lamp 4. A vertical reciprocating movement to simulate the leg-movement of a running horse is obtained by the use of a series of transparent strips 29 representing pairs of legs of horses on the stationary, intermediate screen, and the transparency 3 of the traveling band. The legs of the horse 3 coact with the legs or strips 29 for the interception of the light rays, and at the points of intersection the running movement of the legs is simulated.

The leg movement of the horses is only one example of the animated, or motion picture effect, which is produced by the combination of transparent portions on the traveling band and the intermediate stationary screen. If a vertical, reciprocating or transverse movement, as that of the pistons of an internal combustion engine, is desired, this effect may be produced on panel 5 by the combination of horizontal transparencies or strips on the traveling band and transparent strips arranged, alternately, at forty-five degree angles to the perpendicular on the stationary intermediate screen, and other "animated" movements may be produced by variations in the relative positions of the transparencies on the traveling band and the intermediate screen.

Thus, in addition to the longitudinally moving letters or inanimate images projected on the display-panel, a continuous scene-in-action, motion picture effect, or animation of an image or images, are also displayed on the panel, and move across the vision of the observer.

The intermediate screen 28, of celluloid or glass, is supported in a suitable manner, as in frame 30, and the screen is provided with a central, transparent field 29a, above the transparencies 29 that represent the horses' legs, and the light-transmitted letters of the sign pass through this transparent field. An upright shield 31 is arranged back of the lamp 4 to protect the interior of the housing from dissemination of heat from the lamp. A fan 32 may be mounted on the motor for circulating air in the housing, and vent openings 33, and a light opening 34, are provided in the top of the housing for ventilation. This opening 34 also provides light from the lamp for illuminating a stationary sign 35 on the top of the housing.

The number of rollers employed may be varied, depending on the desired length of the traveling band or belt, but preferably a set of operating or driving rollers is used at one side of the housing, with another set of idlers or guide rollers at the opposite side of the housing, and the tension roller or tension rollers may be located at suitable points in the length of the band or belt.

As indicated in Figure 5, the rollers are mounted to revolve on the pointed bearing-end 36 at the upper end of the fixed pin 15, and the roller, which is cored out at its center for the pin, is provided with an upper bearing sleeve 37 and a lower bearing sleeve 38, leaving the major portion of the roller free from the pin.

A metal cap plate 39 is secured, as by integral studs or prongs 40, at the top of the roller, and this cap plate rests on the bearing point 36 of the pin. Thus it will be apparent that the roller is suspended at its bearing point on the pin, and the two bearing sleeves in frictional contact with the pin, retain and guide the roller in its revolutions about the pin, to assure a smooth and noiseless rotation of the roller.

In Figure 4, the display-panel 5a of paper, linen, or other suitable translucent or semi-transparent material, is separated from the housing and the intermediate screen, and the panel is adjustable with relation to the housing and the traveling belt therein. To provide the necessary adjustment, I employ two pairs of side arms 41 on which the panel is supported, and these pairs of arms are slidable in the sleeves 42 mounted on the opposite sides, and exterior of the housing, for use in moving the panel toward or away from the housing. Suitable fasteners, as set bolts or screws 43, may be used in the sleeves to secure the arms in fixed adjusted position. The letter F is displayed on the intermediate screen, and enlarged and projected on the display-panel, to illustrate the use of this form of the display sign or device, and it will be apparent that the size of the letter on the panel is reduced as the panel is moved or adjusted toward the housing, and increased as the panel is adjusted away from the housing.

In Figure 6, where the switch 44 for the lamp and the switch 45 for the motor are indicated at the back of the housing, the device is displaying the letters F E R on the panel 5b, which, as before explained, is the glass panel of a show-window.

In all instances shown, the straight, flat display-flight of the traveling band or belt is arranged parallel with the intermediate screen when it is used and with the display-panel, and the subject matter of the display-flight is projected on the display-panel with uniformity and without distortion. The concentrated filament of the single lamp furnishes the light rays to pass outwardly from the housing to the display-panel, and the letters or words are displayed in enlarged size, but the enlarged letters are exact duplications of one another as to size and shape; and when the intermediate panel coacts with the traveling band to produce the scene-in-action or motion-picture effect, these effects are also uniformly and evenly distributed and enlarged on the panel.

Various changes and alterations may be made, and are contemplated, in the exemplifying structures of the drawings, and it will be apparent that the display device may be adapted for numerous uses, and the belts be provided with a variety of inscriptions, advertisements, and other matter to be displayed.

Having thus fully described my inven- tion, what I claim as new and desire to secure by Letters Patent is:

1. In an illuminated sign of the endless traveling-belt type, the combination with a straight display-flight of the belt having light-transmitting portions and a lamp back of said flight, of means for operating the belt, a display-panel arranged in parallelism with said flight and adapted to receive images projected through said light-transmitting portions, means for varying the distance between said display-panel and display-flight, an intermediate screen, and coacting means on the belt and screen for producing animated movement effects on the panel.

2. In an illuminated sign of the endless traveling-belt type having light-transmitting portions, means for holding a portion of the belt in a straight display-flight, means for operating the belt, and a lamp back of the display-flight, of a display-panel arranged in parallelism with the display-flight, and means for varying the distance between said display-flight and panel.

3. In an illuminated sign of the endless traveling-belt type having light transmitting portions, means for producing a straight display-flight in the traveling belt, means for operating the belt, and an illuminating lamp adjacent the display-flight, of a display-panel parallel with the display-flight, an adjustable support for the display-panel, and means for holding the panel in adjusted position with relation to said flight.

4. In an illuminated sign of the endless traveling-belt type having light transmitting portions, means for holding a portion of the belt in a straight display-flight and means for operating the belt, of a display-panel adapted to receive images from the display-flight, an intermediate screen, and coacting means on the belt and screen for producing animated movement effects on the panel.

5. In an illuminated sign of the endless traveling-belt type having light-transmitting portions, means for holding a portion of the belt in a straight display-flight, and means for operating the belt, of a display-panel adapted to receive images from the display-flight, an intermediate screen having a light-transmitting field, said screen and panel being arranged in parallelism with the flight, and coacting means on the belt and screen for producing animated movement effects on the panel.

6. In an illuminated sign, the combination with a housing, a set of operating rollers and power-transmission means connecting said rollers, a set of guide rollers, a traveling belt, and one roller of each set being arranged to guide the belt in a straight display-flight, of a display panel, and an intermediate screen located in parallelism with said flight and panel.

7. In an illuminated sign, the combination with a housing, a set of operating rollers and power-transmission means between said rollers, a set of guide rollers, a tension-actuated guide roller, a traveling belt, and a roller of each set arranged to guide the belt in a straight display-flight, of a display panel in parallelism with said flight, and an intermediate screen parallel with said flight and panel.

8. In an illuminated sign, the combination of a set of operating rollers and actuating means therefor, a set of guide rollers, a traveling endless belt, and friction means on said rollers terminating short of the edges of the belt, whereby the edges of the belt are conveyed free of the rollers.

9. In an illuminated sign, the combination of a set of operating rollers and actuating means therefor, a set of guide rollers, a traveling endless belt, and annular friction-pads on the rollers terminating short of the edges of the belt, whereby the edges of the belt are conveyed free of the rollers.

10. In an illuminated sign, the combination of a set of operating rollers and actuating means therefor, a set of guide rollers, a traveling endless belt, pins for axially supporting said rollers, a bearing-point at the upper end of each pin, and a bearing-member rigid with the roller for supporting each roller on its pin.

11. In an illuminated sign, the combination of a set of operating rollers and actuating means therefor, a set of guide rollers, and a traveling endless belt, said rollers each having a cored-out center and upper and lower bearing sleeves, a fixed pin for each roller and an upper pointed bearing-end on each pin, and a bearing cap fixed on each roller and suspended on a bearing end.

In testimony whereof, I have affixed my signature.

ALFRED H. ZELEDON.